United States Patent
Akiyama et al.

(10) Patent No.: US 8,412,075 B2
(45) Date of Patent: Apr. 2, 2013

(54) LIGHT DEFLECTOR DEVICE AND IMAGE FORMING APPARATUS

(75) Inventors: Takahiro Akiyama, Kawasaki (JP); Kazunari Fujii, Kawasaki (JP); Yukio Furukawa, Sagamihara (JP); Shinichiro Iimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 327 days.

(21) Appl. No.: 12/992,569

(22) PCT Filed: May 11, 2009

(86) PCT No.: PCT/JP2009/059105
§ 371 (c)(1),
(2), (4) Date: Nov. 12, 2010

(87) PCT Pub. No.: WO2009/139484
PCT Pub. Date: Nov. 19, 2009

(65) Prior Publication Data
US 2011/0064470 A1  Mar. 17, 2011

(30) Foreign Application Priority Data

May 14, 2008 (JP) .................................. 2008-126596

(51) Int. Cl.
*G03G 15/04* (2006.01)
(52) U.S. Cl. .................................................... 399/221
(58) Field of Classification Search .................. 235/454; 359/224.1; 399/220, 221
See application file for complete search history.

(56) References Cited

U.S. PATENT DOCUMENTS

| 6,975,442 B2 | 12/2005 | Gessner et al. | |
| 7,446,921 B2 * | 11/2008 | Suzuki et al. | 359/224.1 |
| 7,474,165 B2 | 1/2009 | Kato et al. | |
| 7,775,433 B2 * | 8/2010 | Ando | 235/454 |
| 2009/0051992 A1 | 2/2009 | Fujii et al. | |

FOREIGN PATENT DOCUMENTS

| EP | 1918759 A | 5/2008 |
| JP | 2004-279947 A | 10/2004 |
| JP | 2005-292627 A | 10/2005 |
| JP | 2005-326462 A | 11/2005 |
| JP | 2005-326745 A | 11/2005 |
| JP | 2005-326746 A | 11/2005 |
| JP | 2007-199213 A | 8/2007 |
| JP | 2008-076745 A | 4/2008 |
| JP | 2008-292741 A | 12/2008 |
| WO | 2005/063613 A | 7/2005 |
| WO | 2007/094489 A | 8/2007 |
| WO | 2007094489 A1 | 8/2007 |

* cited by examiner

*Primary Examiner* — Hoang Ngo
(74) *Attorney, Agent, or Firm* — Canon U.S.A., Inc. IP Division

(57) ABSTRACT

A light deflector device includes a light deflector having an oscillation system, a driving unit for driving the oscillation system and a drive controlling unit for supplying a drive signal. The oscillation system simultaneously generates a first oscillating motion of a first frequency and a second oscillating motion of a second frequency. The drive controlling unit supplies a drive signal formed by synthetically combining a first signal having the first frequency and a second signal having the second frequency to the driving unit and, at the same time, another drive signal for changing at least the amplitude of the first oscillating motion, the amplitude of second oscillating motion or the relative phase difference of the first oscillating motion and the second oscillating motion to the driving unit in order to correct an offset of scanning light deflected by the light deflector.

5 Claims, 10 Drawing Sheets

LIGHT DEFLECTOR DEVICE AND IMAGE FORMING APPARATUS

TECHNICAL FIELD

The present invention provides a technique relating to the technical field of light deflector devices having a plurality of oscillating bodies supported so as to be able to oscillate. Further, the invention relates to an image forming apparatus such as a scanning type display, a laser beam printer and a digital copying machine with use of the light deflector device.

BACKGROUND ART

Known resonance-type light deflector devices that have hitherto been proposed have the following advantages that characterize them when compared with scanning optical devices employing a rotary polygon mirror. Namely, they can be remarkably downsized and consume less power and the variation in elevation angles of their mirror surfaces are theoretically free.

On the other hand, since the deflection angle (displacement angle) of the mirror of a resonance-type light deflector device changes in a sinusoidal manner in principle, its angular velocity is not constant. International Publication No. WO2005/063613 discloses a technique of forming a region where the angular velocity of the mirror is substantially constant by correcting this characteristic drawback.

More specifically, PCT International Publication WO2005/063613 discloses a micro-oscillating member comprising a plurality of torsion springs and a plurality of movable elements and having a plurality of isolated characteristic oscillation modes in a device. The plurality of isolated characteristic oscillation modes of the micro-oscillating member include a reference oscillation mode that is a characteristic oscillation mode of a reference frequency and even numbered oscillation modes that are characteristic oscillation modes of approximate even number times of the reference frequency. The invention of PCT International Publication WO2005/063613 realizes saw-tooth wave drive by oscillating the micro-oscillating member in those oscillation modes.

Japanese Patent Application Laid-Open No. 2005-292627 discloses a technique of detecting the clock time when a deflected scanning light beam passes a predetermined position by means of a light sensor in order to detect the scanning position of the light beam that is deflected by a deflector mirror driven to oscillate in a sinusoidal manner and controlling the state of oscillation of the deflector mirror, using the clock time.

DISCLOSURE OF THE INVENTION

When a light deflector device is employed in an image forming apparatus such as an electro-photographic apparatus or a scanning type display, a high degree of precision is required for placing it in the apparatus in terms of position and direction of placement. If the position and/or the direction of placing the light deflector device is not precisely correct, the center of scanning of deflected light on a target to be scanned is displaced from the central position of the target to consequently give rise to an offset to the deflected light.

However, while the above-cited PCT International Publication WO2005/063613 discloses a technique of driving an oscillating body by means of a synthetic wave formed by a plurality of sinusoidal waves, it does not disclose any technique of correcting such an offset. In other words, it does not propose any technique relating to the correction of an offset that arises when driving a pair of oscillating bodies having two characteristic oscillation modes by means of a synthetic wave formed by a pair of sinusoidal waves corresponding to the two characteristic oscillation modes.

In view of the above-identified problem, the present invention provides a light deflector device having a light source, a light deflector for deflecting light from the light source and a photodetector for detecting information relating to a deflection angle of scanning light deflected by the light deflector. The light deflector by turn has an oscillation system including a first oscillating body and a second oscillating body supported so as to be able to oscillate, a driving unit for applying a torque to at least either the first oscillating body or the second oscillating body and a drive controlling unit for supplying a drive signal to the driving unit. The oscillation system has a support portion, a first oscillating body, a first elastic support portion for supporting the first oscillating body so as to make it able to oscillate relative to the support portion around an axis of oscillation, a second oscillating body and a second elastic support portion for supporting the second oscillating body so as to make it able to oscillate relative to the first oscillating body around the same axis as the axis of rotation of the first oscillating body. A light deflecting element is formed at least on one surface of at least either the first oscillating body or the second oscillating body. The oscillation system is adapted to be able to simultaneously generate a first oscillating motion of moving at a first frequency, the first frequency being a fundamental frequency, and a second oscillating motion of moving at a second frequency, the second frequency being a frequency of integer times of the fundamental frequency. The drive controlling unit is adapted to supply a drive signal formed by synthetically combining a first signal having the first frequency and a second signal having the second frequency to the driving unit. At the same time, it supplies another drive signal for changing at least the amplitude of the first oscillating motion, the amplitude of the second oscillating motion or the relative phase difference of the first oscillating motion and the second oscillating motion to the driving unit in order to correct an offset of scanning light deflected by the light deflector.

In view of the above-identified problem, the present invention also provides an image forming apparatus having a light source, a light deflector device as defined above for deflecting light from the light source, the apparatus being adapted to irradiate a target to be scanned with at least part of the light deflected by the light deflector device.

In view of the above-identified problem, the present invention also provides an offset correction method for correcting an offset of scanning light in a light deflector device. The light deflector device includes a light source, a light deflector for deflecting light from the light source and a photodetector for detecting information relating to a deflection angle of scanning light deflected by the light deflector. The light deflector has an oscillation system including a first oscillating body and a second oscillating body supported so as to be able to oscillate and a driving unit for applying a torque to at least either the first oscillating body or the second oscillating body. The oscillation system has a support portion, a first oscillating body, a first elastic support portion for supporting the first oscillating body so as to make it able to oscillate relative to the support portion around an axis of oscillation, a second oscillating body and a second elastic support portion for supporting the second oscillating body so as to make it able to oscillate relative to the first oscillating body around the same axis as the axis of oscillation of the first oscillating body. The offset correction method includes a first step of driving the light deflector by means of the driving unit according to a predetermined drive signal and determining the offset of scanning light according to a passing time of scanning light as detected by the photodetector, a second step of adjusting and controlling the deflection angle of scanning light including a predetermined deflection angle and the offset in order to obtain a deflection angle as approximated to the predetermined deflection angle in a partial domain of time according to the determined offset, a third step of converting a target time for the predetermined deflection angle to the target time for the deflection angle of scanning light including the offset and adjusted and controlled according to the determined offset, and a fourth step of controlling the predetermined drive signal to be supplied to the driving unit, using a matrix M computationally determined by using the drive signal corresponding to the predetermined deflection angle according to a detection signal from the photodetector and the target time obtained as a result of the conversion, starting from the drive signal showing initial values.

Thus, the present invention establishes a technique of correcting an offset of scanning light in a light deflector device for driving oscillating bodies by means of a synthetic wave formed by a plurality of waves so that it can relax the accuracy required for assembling a light deflector device in terms of position and direction. Additionally, the present invention enables to form an excellent image by means of an image forming apparatus employing a light deflector device that can correct an offset of scanning light.

Further features of the present invention will become apparent from the following description of exemplary embodiments with reference to the attached drawings.

BEST MODE FOR CARRYING OUT THE INVENTION

Now, an embodiment of light deflector device according to the present invention will be described below by referring to the accompanying drawings.

(Device Configuration of Light Deflector Device)

Figure 1:
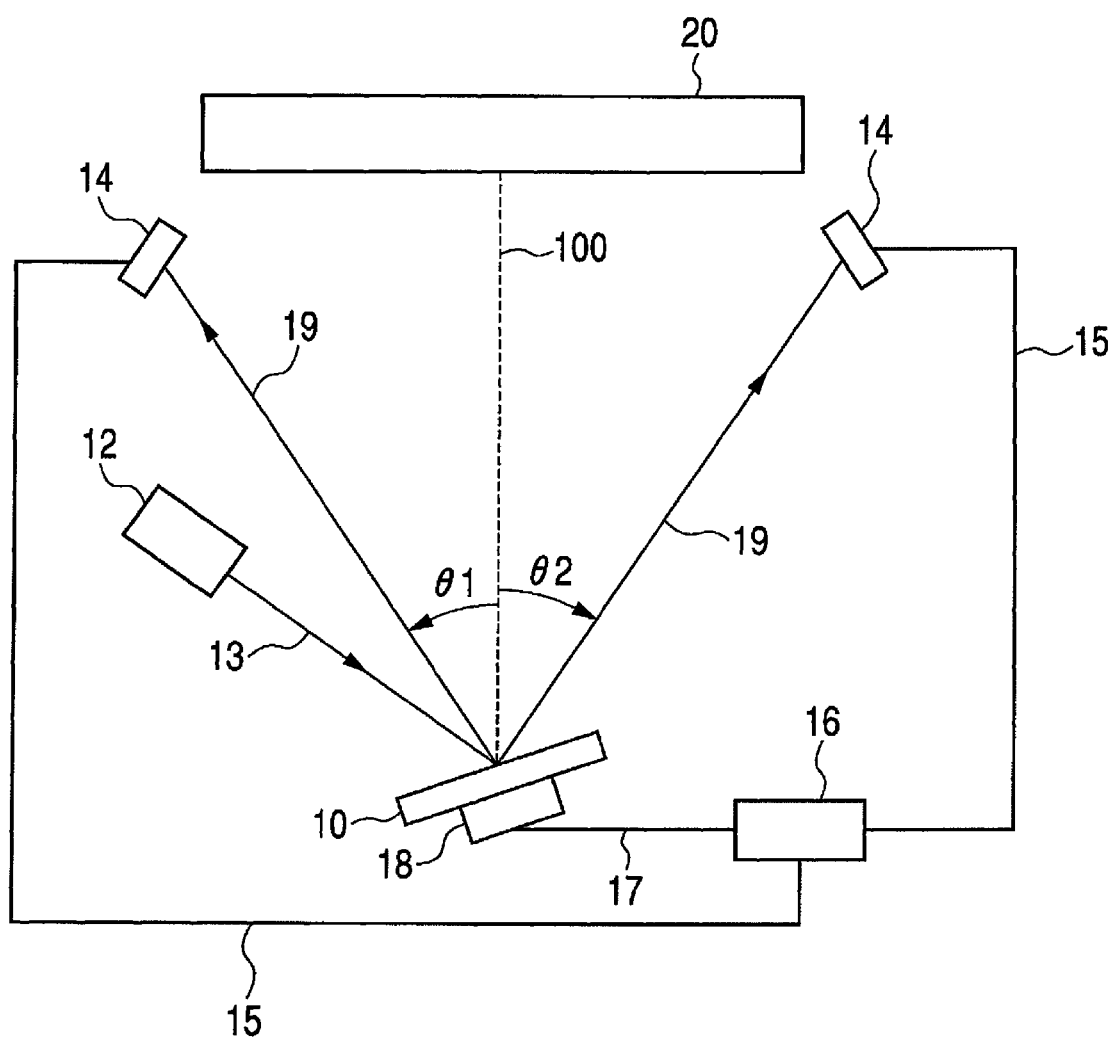
FIG. 1 is a schematic illustration of an embodiment of light deflector device according to the present invention, illustrating the configuration thereof.

As illustrated in FIG. 1, the light deflector device of this embodiment has a light source 12, a light deflector 10 for reflecting and deflecting light 13 from the light source and a pair of photodetectors 14 for detecting deflected light, or scanning light, reflected and deflected by the light deflector at the timing when it passes a predetermined deflection angle.

The oscillation system of the light deflector 10 of this embodiment includes first and second oscillating bodies, a first torsion spring that operates as a first elastic support portion for supporting the first oscillating body so as to make it able to oscillate relative to the support portion and a second torsion spring that operates as a second elastic support portion for supporting the second oscillating body so as to make it able to oscillate relative to the first oscillating body. The second torsion spring that operates as the second elastic support portion supports the second oscillating body so as to make it possible to oscillate around the same axis as the torsion axis of the first oscillating body.

Figure 2A:
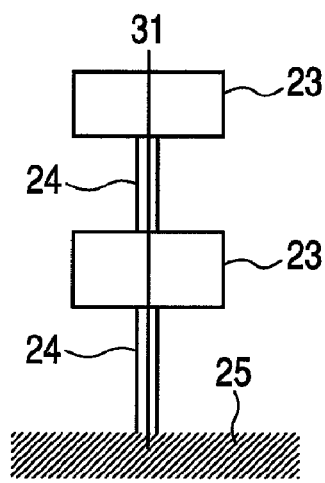
FIGS. 2A, 2B and 2C are schematic illustrations of oscillating bodies that can be used for light deflectors.
Figure 2B:
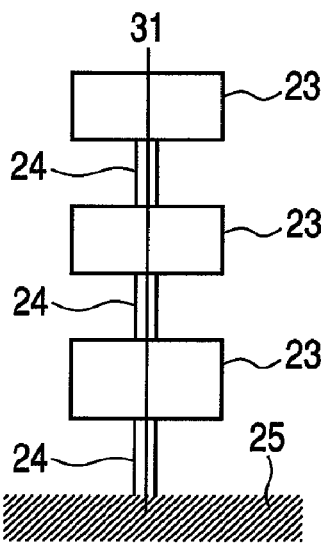
Figure 2C:
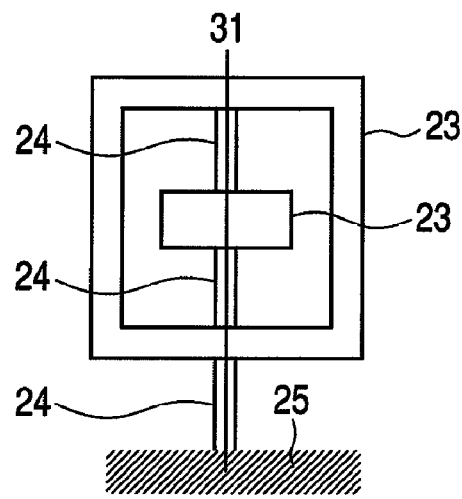

FIGS. 2A through 2C are schematic illustrations of oscillating systems that can be used for the light deflector 10. The light deflector of FIG. 2A is formed by means of an oscillation system where two oscillating bodies 23 and a support portion 25 are linking in series on a torsion axis 31 through a torsion spring 24. The light deflector of FIG. 2B is formed by means of an oscillation system where three oscillating bodies 23 and a support portion 25 are linking in series on a torsion axis 31 through a torsion spring 24. The light deflector of FIG. 2C is formed by means of an oscillation system where one of two oscillating bodies 23 is telescopically linked to the other oscillating body 23 through a torsion spring 24 and the other oscillating body 23 is linked to a support portion 25 through the torsion spring 24.

The light deflector 10 formed by any one of the above-described oscillation systems is able to deflect light at a plurality of (typically two) frequencies in a peripheral direction of the torsion axis 31 so that it deflects the light beam 13 produced from the light source 12. The oscillation system has a structure that can simultaneously generate a first frequency (natural frequency) and a second frequency (natural frequency) that is integer times of the first natural frequency. The natural frequencies of an oscillation system are determined as a function of the spring constant of the torsion spring 24 and the moment of inertia of the first oscillating body, that of the second oscillating body and that of the torsion spring 24 around the torsion axis. When a permanent magnet is fitted to the oscillation body, the natural frequencies thereof are determined by taking the moment of inertia thereof into consideration.

A light reflecting plane, which is a light deflecting element, is formed at least on one of the surfaces of at least one of the plurality of oscillating bodies. The relationship between the first natural frequency and the second natural frequency can be selected according to the purpose of use of the light deflector device. The oscillation system of this embodiment is designed so as to provide a first natural frequency and a second natural frequency that is twice of the first natural frequency so that deflected light that is deflected by the light deflector is made to scan a target to be scanned with a substantially constant velocity domain. The motion of the oscillation system of this embodiment will be described in greater detail below.

The principle of motion of the light deflector device of this embodiment is basically the same as the one described in PCT International Publication WO2005/063613. Generally, the equation of free oscillation of an oscillation system having n oscillating bodies and n torsion springs is defined by formula (1) shown below:

$$M\ddot{\theta} + K\theta = 0 \tag{1}$$

$$\theta = \begin{bmatrix} \theta_1 \\ \theta_2 \\ \vdots \\ \theta_n \end{bmatrix}, M = \begin{bmatrix} I_1 & & & \\ & I_2 & & \\ & & \ddots & \\ & & & I_n \end{bmatrix},$$

$$K = \begin{bmatrix} k_1 & -k_1 & & \\ -k_1 & k_1+k_2 & -k_2 & \\ & & \ddots & \\ & & -k_{n-1} & k_{n-1}+k_n \end{bmatrix}$$

where $I_k$ is the moment of inertia of each oscillating body, $k_k$ is the spring constant of each torsion spring and $\theta_k$ is the torsion angle (deflection angle) of each oscillating body (k= 1, . . . , n).

If the characteristic value of $M^{-1}K$ of the system is $\lambda_k$ (k= 1, . . . , n), the angular frequency (drive frequency) $\omega_k$ of the natural oscillation mode of each oscillating body is defined as $\omega_k = \sqrt{(\lambda_k)}$.

In the oscillation system of a light deflector device including n oscillating bodies and n torsion springs and having n oscillation modes, the oscillating bodies can be made to show various motions when $\omega_k$ is made to include a fundamental frequency and n−1 frequencies that are integer times of the fundamental frequency. Integer times as used herein include approximate integer times that are found within a numerical range between 0.98n and 1.02n times (n being an arbitrarily selected integer) of the fundamental frequency.

Particularly, when the light deflector device of this embodiment is formed by using two oscillating bodies and two elastic support portions (torsion springs) and $\omega_k$ is made to include a fundamental frequency and frequencies that are integer times of the fundamental frequency, it can be driven at a substantially constant angular velocity so as to confine the fluctuations of the angular velocity of the oscillating bodies to a predetermined range.

Figure 3:
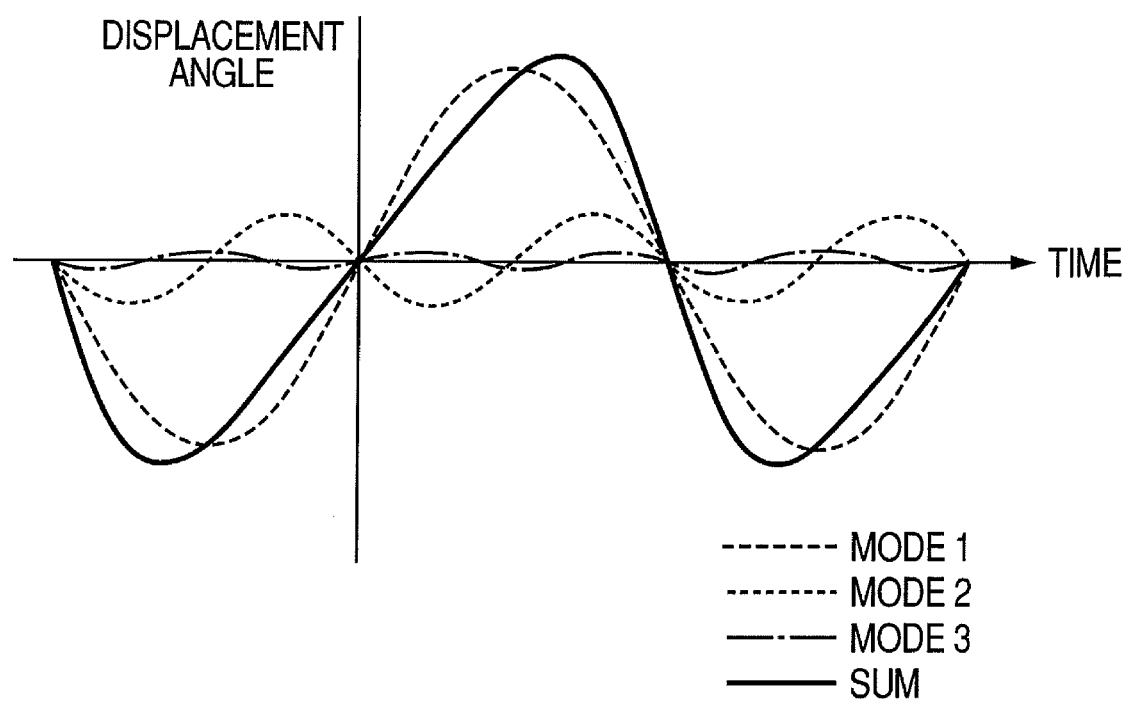
FIG. 3 is a graph illustrating the relationship between the displacement angle of an oscillating body and time when an oscillation system having three oscillation modes is driven.

Additionally, when n=3, for instance, the oscillation system includes three oscillating bodies and three torsion springs and hence has three oscillation modes. Then, if the frequencies of the three oscillation modes are made to show a relationship of 1:2:3 and the oscillation system is energized in three oscillation modes simultaneously, the device can be driven with fluctuations of angular velocity smaller than the arrangement where n=2. FIG. 3 is a graph illustrating the relationship between the displacement angle of an oscillating body and time that is obtained when an oscillation system having three oscillation modes, wherein the frequencies of the three oscillation modes are made to show a relationship of 1:2:3 and the amplitudes of the oscillation components in the three oscillation modes is made to have a ratio of 24:−6:1, is driven. The ratio of the amplitudes includes a negative value because the displacement from the origin to the ½ period is negative in mode 2 in FIG. 3.

The relationship between the deflection angle θ(t) of one of the oscillation bodies of the light deflector and time is expressed by formula (2) shown below when the light deflector is driven so as to make deflected light scan a target to be scanned at a substantially constant velocity. Note that, while $\omega_2$ is twice of the fundamental frequency in the following description, the underlying principle is the same if it is integer times other than twice. Also note that the deflection angle θ of an oscillating body of a light deflector refers to the angle between the straight line connecting the light deflector 10 and the center of scanning of the target to be scanned 20 (to be referred to as reference axis 100 hereinafter) and the scanning light beam (FIG. 1). However, when there exists an offset, the deflection angle of the oscillating body from the neutral position and the deflection angle of scanning light will be shifted by the effect.

$$\theta(t) = A1 \cdot \sin(\omega t) + A2 \cdot \sin(2\omega t + \emptyset) \tag{2}$$

In the above formula, A1 and ω are respectively the amplitude and the angular frequency of the first oscillating motion, A2 is the amplitude of the second oscillating motion and ø is the relative phase difference of the oscillating motions of the two frequencies. As viewed from the reference axis 100, an angle given by a counterclockwise motion is defined to be a positive angle, whereas an angle given by a clockwise motion is defined to be a negative angle.

Figure 4A:
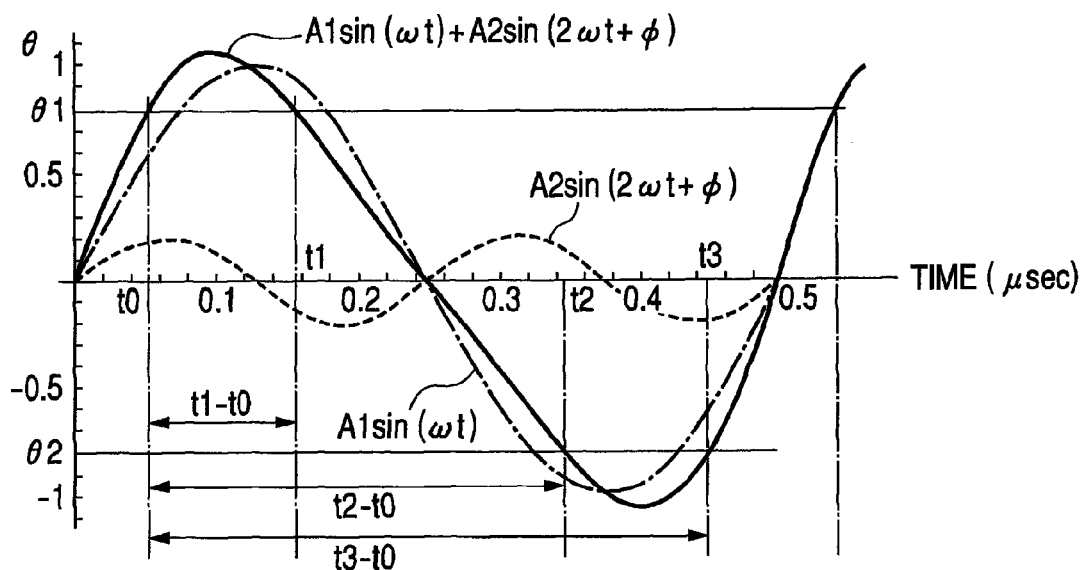
FIGS. 4A and 4B are graphs illustrating the relationship between the deflection angle of a light deflector and scanning light and time.
Figure 4B:
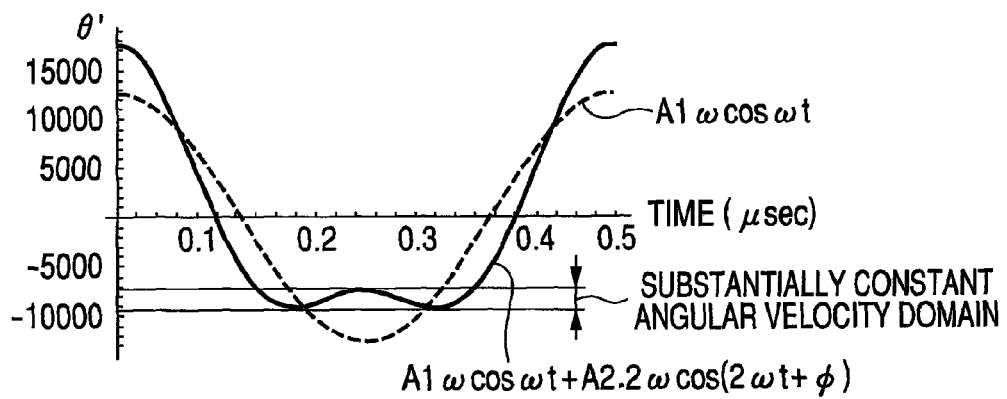

FIG. 4A is a graph illustrating the relationship between the deflection angle θ(t) of scanning light and time. In the graph, the broken lines respectively indicate the A1·sin(ωt) component and the A2·sin(2ωt+ø) component and the solid line indicates the values obtained by synthetically combining the components. FIG. 4B illustrates the substantially constant velocity domain of the graph of FIG. 4A.

Figure 5:
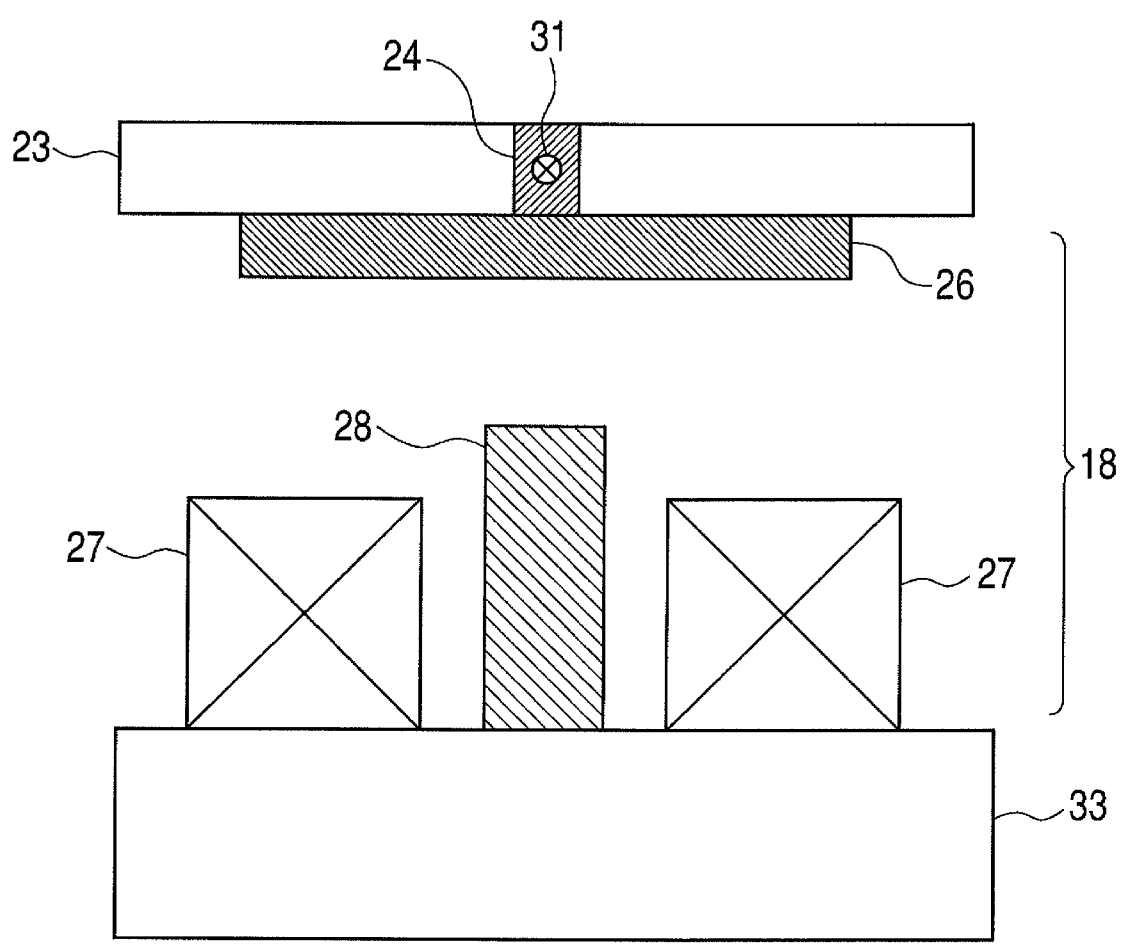
FIG. 5 is a schematic cross sectional view of a light deflector and a driving unit.

Now, the driving unit 18 for driving the light deflector 10 of FIG. 1 will be described below. The driving unit 18 is arranged so as to apply a torque to at least either the first oscillating body or the second oscillating body. FIG. 5 is a schematic cross sectional view of a driving unit 18 that can be used for this embodiment. The driving unit 18 is formed by using a coil 27, a magnetic body 28 that operates as core and a permanent magnet 26 that is bonded to at least one of the surfaces of at least one of the oscillating bodies 23. The coil 27 and the magnetic body 28 are rigidly secured to a fixed member 33. The magnetic body 28 is made of a magnetically soft material in order to intensify the magnetic field generated by the coil 27. Note, however, that the magnetic body 28 may not necessarily be provided when the magnetic field generated by the coil 27 is sufficiently strong and can oscillate the oscillating bodies 23.

With an alternative method of driving the light deflector 10 as illustrated in FIG. 1, a coil is arranged at least on one of the surfaces of the oscillating bodies while a permanent magnet is rigidly secured to a fixed system such as a housing and the light deflector 10 is driven by means of the magnetic field generated between them. With another alternative method of driving the light deflector 10 as illustrated in FIG. 1, the light deflector 10 is driven by means of the electrostatic force generated between an electrode arranged on one of the oscillating bodies 23 and another electrode rigidly secured to a fixed system such as a housing. With still another alternative method of driving the light deflector 10, force is applied directly to the oscillation system typically by means of a piezoelectric element.

The drive controlling unit 16 that is illustrated in FIG. 1 supplies a drive signal 17 to the driving unit 18 in order to drive the oscillating bodies. More specifically, the drive controlling unit 16 supplies a drive signal 17 to the coil 27 of the driving unit 18 when the driving unit 18 has a configuration as illustrated in FIG. 5. A magnetic field is generated at the coil 27 by the drive signal and magnetically cooperates with the permanent magnet 26 to apply a torque to the oscillating bodies 23.

Figure 6A:
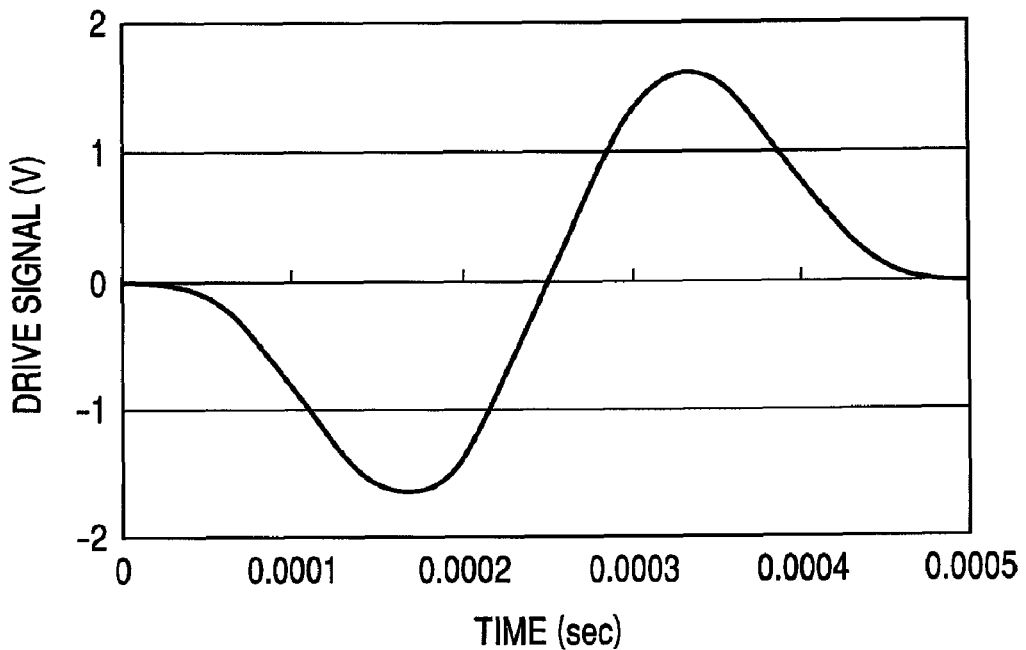
FIGS. 6A and 6B are schematic illustrations of drive signals.

In this embodiment, a drive signal 17 that is formed by synthetically combining a first signal having a first frequency and a second signal having a second frequency that is twice of the first frequency is supplied to the driving unit 18 so as to make deflected light 19, which is a light beam deflected by the light deflector 10, scan the target to be scanned 20 at a substantially constant velocity. Such a drive signal can be defined by formula (3) shown below:

$$F(t) = B1 \cdot \sin \omega t + B2 \cdot \sin(2\omega t + \Psi d) \tag{3}$$

where B1 and B2 are amplitudes and $\Psi d$ is the phase difference. FIG. 6A illustrates an exemplar waveform of a drive signal for driving the light deflector of this embodiment. The drive waveform is the waveform of the drive signal defined by the formula (3) above. It is formed by synthetically combining a first signal having a first frequency and a second signal having a second frequency that is twice of the first frequency. As a signal having such a drive waveform is supplied to the driving unit 18, deflected light 19, which is a light beam deflected by the light deflector 10 having an oscillation system of a variable deflection angle as illustrated in FIG. 4, can be made to scan the target to be scanned 20 at a substantially constant velocity.

Figure 6B:
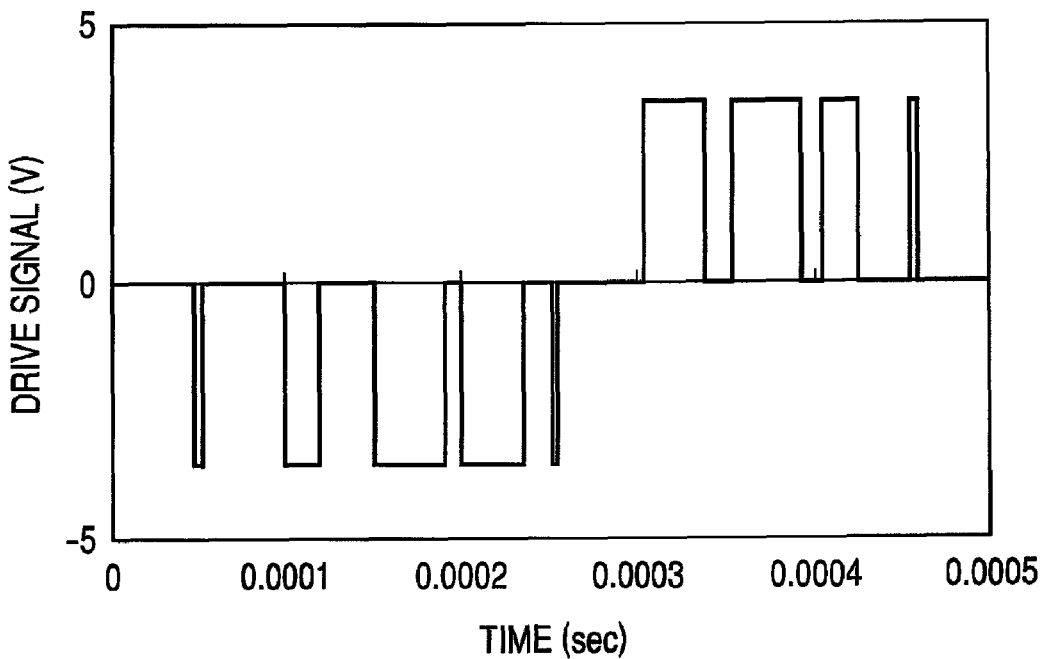

While the drive waveform is formed by synthetically combining sinusoidal waves in the above description, it may alternatively be formed by means of a number of pulse sequences as illustrated in FIG. 6B. In other words, the light deflector can be driven by temporarily changing the number of pulses, the pulse interval and the pulse width.

Figure 7:
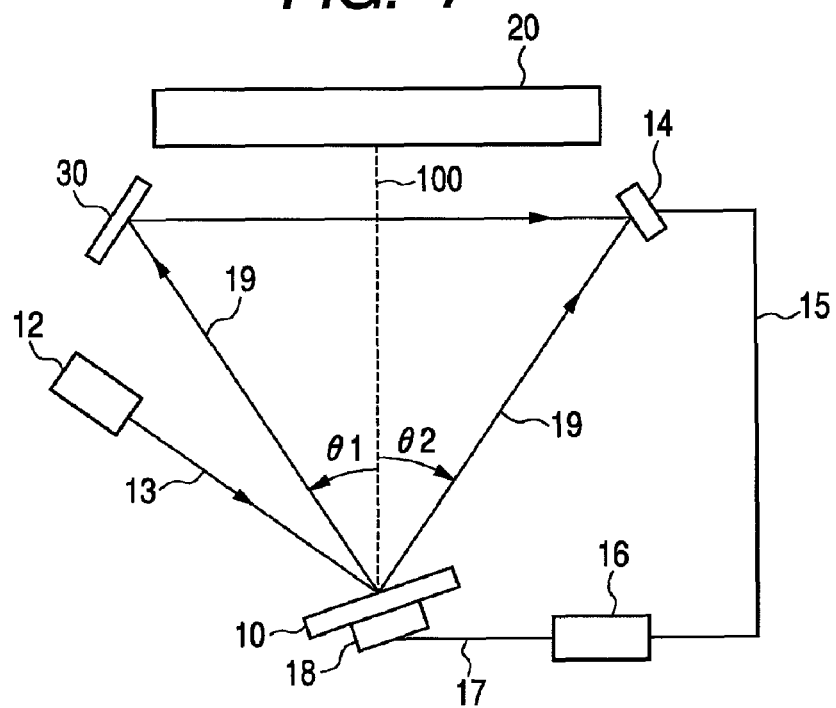
FIG. 7 is a schematic illustration of another embodiment of light deflector device according to the present invention, illustrating the configuration thereof.

Now, the photodetectors 14 of FIG. 1 will be described. The photodetectors 14 are so arranged that they can detect light when the light beam 19 shows at least two deflection angles (θ1, θ2). The photodetectors 14 detect the clock time when deflected light 19 passes there and output a detection signal 15 to the drive controlling unit 16. The photodetectors 14 are arranged at positions that respectively correspond to the two deflection angles of θ1 and θ2 in FIG. 1. An alternative arrangement as illustrated in FIG. 7 may be employed. In the arrangement of FIG. 7, a reflector 30 is arranged at a position corresponding to θ1 and a photodetector 14 is arranged at a position corresponding to θ2. Deflected light 19 corresponding to θ1 is reflected by the reflector 30 and detected by the photodetector 14, whereas deflected light 19 arranged at a position corresponding to θ2 is directly detected by the photodetector 14.

FIGS. 4A and 4B illustrate the relationship between time and the deflection angle when the photodetector 14 is adapted to detect deflection angles of θ1 and θ2. Referring to FIGS. 4A and 4B, clock times t0 and t1 are detected at deflection angle θ1 and clock times t2 and t3 are detected at deflection angle θ2.

The photodetector 14 generates a signal 15 that indicates the clock time when it detects light and transmits the signal 15 to the drive controlling unit 16. The drive controlling unit 16 generates a drive signal for driving the light deflector 10 according to the signal 15 from the photodetector 14 and supplies the drive signal 17 to the driving unit 18. The oscillating bodies 23 are driven by the torque applied from the driving unit 18. An exemplary technique of producing a target drive signal for realizing an intended oscillating motion for the oscillating bodies by way of a converging operation according to the signal 15 from the photodetector 14 will be described in detail in Example 1. The above description applies to general drive control when there is no offset, which is described earlier.

(Offset Detection Method)

Now, the method of detecting the offset of the light deflector device of this embodiment will be described. Firstly, an instance where the offset of the light deflector device is equal to 0 will be described. When the light deflector 10 of FIG. 1 is driven by means of a single sinusoidal wave, light will scan with an amplitude of A1 and a frequency of f (or an angular frequency of ω). If the deflection angles that the photodetector 14 detects are θ1 and θ2 and the detected clock times are ts0, ts1, ts2 and ts3, the following formulas (4) hold true.

$$ts1 - ts0 = \frac{1}{2f} - 2\arcsin\frac{\theta 1}{A1} \tag{4}$$

$$ts3 - ts2 = \frac{1}{2f} - 2\arcsin\frac{(-\theta 2)}{A1}$$

$$ts2 - ts1 = \arcsin\frac{\theta 1}{A1} + \arcsin\frac{(-\theta 2)}{A1}$$

Now, a case where the light deflector device actually has an offset will be described. If the light deflector 10 and the light source 12 are placed at positions that are displaced from the respective proper placement positions, light scanning the target to be scanned 20 shows an offset. Then, the actual center of scanning is displaced from the proper center of scanning on the target to be scanned 20 by the offset. For example, if the light source 12 is displaced from its proper placement position by $\delta\Psi 1$, the actual center of scanning on the target to be scanned 20 is displaced from the proper center of scanning by $\delta\Psi 1$. Additionally, if the light deflector 10 is displaced from its proper placement position by $\delta\Psi 2$, the actual center of scanning on the target to be scanned 20 is displaced from the proper center of scanning by $2 \times \delta\Psi 2$. If the light source 12 is displaced from its proper placement position by $\delta\Psi 1$ and the light deflector 10 is displaced from its proper placement position by $\delta\Psi 2$, the actual center of scanning on the target to be scanned 20 is displaced from the proper center of scanning by $\delta\Psi 1 + 2 \times \delta\Psi 2$. In other words, the offset is the total sum $\delta\Psi$ of the positional displacement of the light source 12 and that of the light deflector 10, and there exists a relationship of $\delta\Psi = \delta\Psi 1 + 2 \times \delta\Psi 2$.

Figure 8:
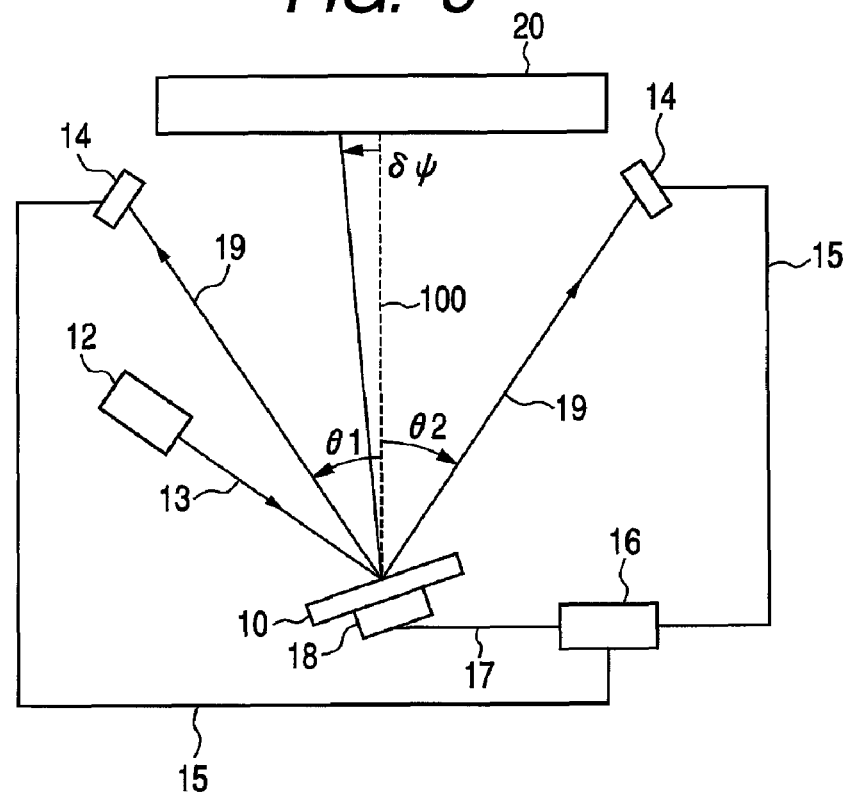
FIG. 8 is a schematic illustration of the embodiment of light deflector device, illustrating the configuration thereof when the device has an offset.

Now, assume that the offset of the light deflector device of FIG. 8 is $\delta\Psi$ and the photodetector 14 detects light with angles of deflection of θ1 and θ2 at clock times t0, t1, t2 and t3. Then, if the light deflector 10 is driven by a sinusoidal wave manner with a drive frequency of f and an amplitude of A1, the time detected by the drive is expressed by formulas (5) shown below.

$$t1 - t0 = \frac{1}{2f} - 2\arcsin\frac{\theta 1 - \delta\psi}{A1}, \tag{5}$$

$$t3 - t2 = \frac{1}{2f} - 2\arcsin\frac{-\theta 2 + \delta\psi}{A1}$$

If there is an offset, the clock times for θ1 and θ2 that are detected by the photodetector 14 are shifted from those that are detected by the photodetector 14 when there is not any offset. In other words, when the light deflector device has an offset, the intercept on the y-axis (deflection angle θ) of each of the curves in the graph of FIG. 4A is displaced upward or downward so that the clock times t0, t1, t2 and t3 that are detected for θ1 and θ2 will be shifted. Since the values of θ1, θ2, A1 and f are known, δΨ can be determined by solving the equations of (5).

The values of θ1, θ2, A1 and f are stored in advance in the drive controlling unit 16 of the light deflector device according to the present embodiment. Then, the drive controlling unit 16 computationally determines the value of the offset δΨ by solving the equations of formulas (5), using the clock times t0, t1, t2 and t3 obtained by means of the detection signal 15 from the photodetector 14 and the stored values of θ1, θ2, A1 and f.

(Offset Correction Method)

The offset correction method will be described below. In the present embodiment, if the light deflector 10 has an offset of δΨ, the relationship between the deflection angle θ(t) of the scanning light and time is expressed by formula (6) shown below.

$$\theta(t) = A1 \cdot \sin(\omega t) + A2 \cdot \sin(2\omega t + \phi) + \delta\Psi \qquad (6)$$

In other words, when the light deflector 10 is standing still (at a neutral position) and the angle between the light beam and the reference axis 100 is δΨ, the angle is equal to the offset. When the light beam has such an offset, the center of scanning of the scanning light beam on the target to be scanned 20 is displaced accordingly. The center of the domain where the light deflector 10 shows a substantially constant angular velocity is also displaced from the reference axis 100 by a distance equal to the offset δΨ. In this way, the domain where the scanning light beam shows a substantially constant angular velocity on the target to be scanned 20 is displaced according to the offset. Thus, a right end portion of the target to be scanned 20 goes out of the domain where the scanning light beam shows a substantially constant angular velocity.

On the other hand, the light deflector device of this embodiment can arbitrarily modify the displacement of the reciprocating motion of the scanning light beam by driving the light deflector so as to change the values of the parameters A1, A2 and ø in the formula (6) expressing the deflection angle of the scanning light beam. Therefore, if there is a positional displacement, the light deflector is so controlled as to make the scanning light beam show a reciprocating motion that is approximately expressed by the formula (2), which does not involve the offset δΨ for the reciprocating motion in the substantially constant angular velocity domain, by adjusting the values of the parameters A1, A2 and ø in the formula (6). In other words, the influence of the offset δΨ in the substantially constant angular velocity domain can be reduced by controlling the parameters of the drive signal that correspond to the parameters A1, A2 and ø of the formula (6) so as to make the scanning light beam show such a reciprocating motion.

More specifically, for instance, the light deflector can be driven so as to reduce the influence of the offset δΨ in the substantially constant angular velocity domain by changing the values of B1, B2 and δΨ of the drive signal expressed by the formula (3).

Figure 9:
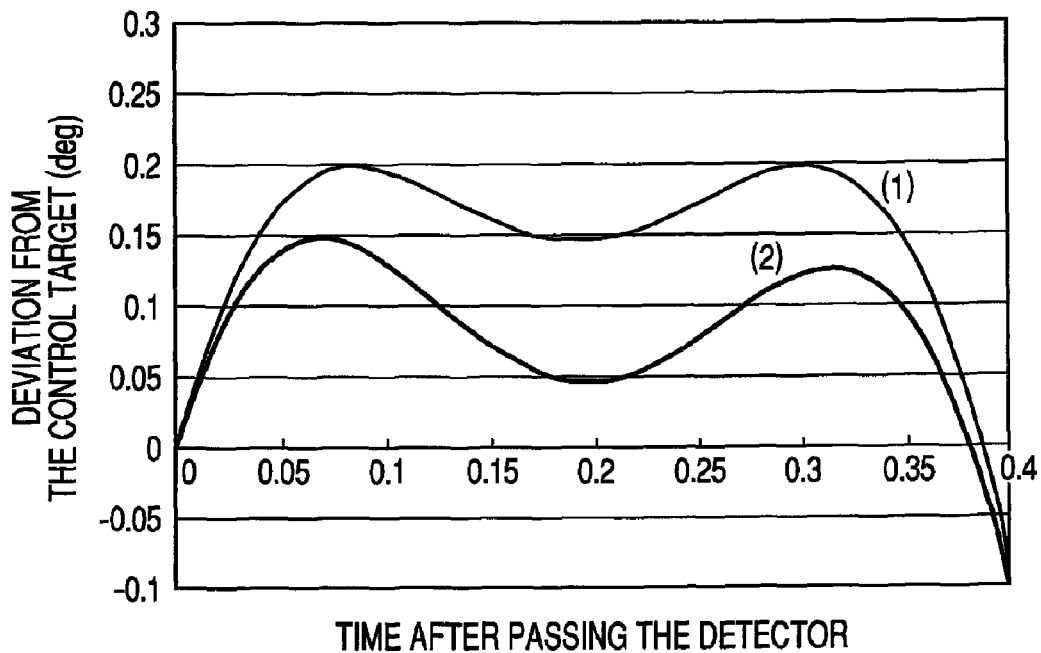
FIG. 9 is a schematic illustration of an example of correction of the offset of the light deflector device.

FIG. 9 is a schematic illustration of a specific example of correction. In FIG. 9, the horizontal axis indicates dimensionless quantities obtained by multiplying time by frequency, whereas the vertical axis indicates deviations from the control target. Thus, values close to nil are close to the control target. If the ideal deflection angle that is the target is expressed by θ=50·sin(2πft)+8·sin(4πft), the deviation from the control target is 0 when the light deflector takes the deflection angle. The deviation from the control target is desirably as close to nil as possible for this embodiment because the scanning velocity needs to be brought close to a constant velocity.

If the light deflector device has an offset of −1 degree, the deflection angle of the light deflector device having such an offset is expressed by θ=50·sin(2πft)+8·sin(4πft)−1 so that the deviation from the control target is expressed by curve (1) in FIG. 9. Thus, if values of A1=50.00917, A2=7.99702 and ø=0.00584443 are selected for A1, A2 and ø, then the deflection angle is expressed by θ=50.00917·sin(2πft)+7.99702·sin(4πft+0.00584443)−1.0 and the deviation shows a waveform indicated by curve (2) in FIG. 9. The deviation indicated by this waveform is apparently reduced from the deviation before the control as indicated by the curve (1) so that the light deflector is adjusted and controlled to show a more ideal waveform.

Thus, if the light deflector has an offset, the influence of the offset can be reduced by bringing the values of A1, A2 and ø of the deflection angle θ that involves the offset to respective desired values. As pointed out above, the offset δΨ can be computationally determined by means of the formula (5) so that the quantities of the changes of the values of A1, A2 and ø are automatically determined when the relationship between the quantities of the changes of the values of A1, A2 and ø and δΨ is formulated in advance. Therefore, the influence of the offset can be reduced by adjusting and controlling the drive signal relative to its initial value so as to realize the adjusted and modified deflection angle θ. At the same time, the target values of the detection clock times of the photodetector 14 are also modified and the drive signal is adjusted and controlled relative to its initial value so as to achieve the modified target values. Note that, controlling the light deflector 10 so as to make the clock time when the light beam 19 is detected by the photodetector 14 agree with a desired clock time is equivalent to controlling the amplitude and the phase of the light deflector 10. This will be described in detail in Example 1.

As described above, the drive controlling unit supplies a drive signal for changing the value of at least one of the amplitudes of the first and second oscillating motions and the relative phase difference of the first and second oscillating motions to the driving unit in order to correct the offset of scanning light deflected by the light deflector.

(Control Flow)

Figure 10:
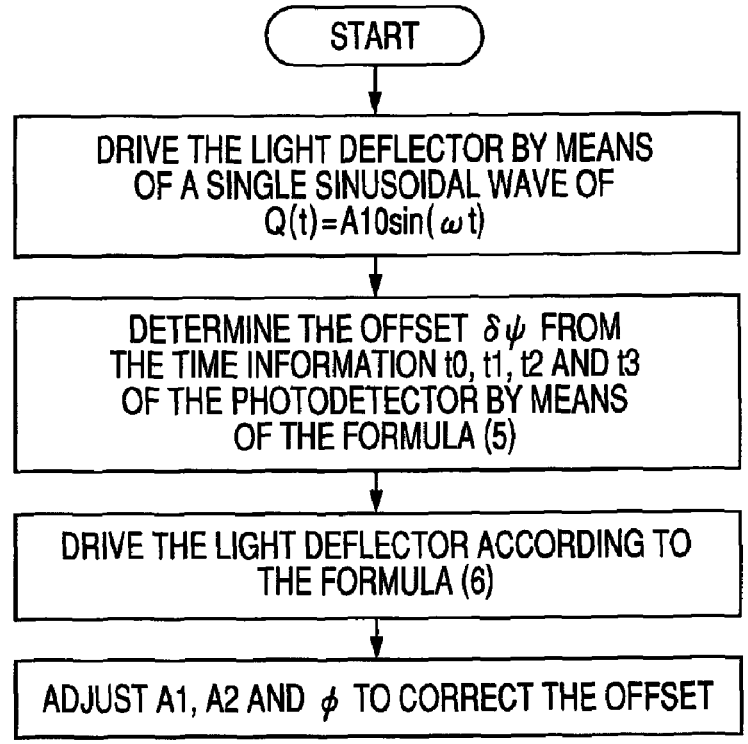
FIG. 10 is a flowchart of the process of detecting and correcting the offset.

Now, the flow of the process of detecting and correcting the placement error of the light source and that of the light deflector of the light deflector device will be described below by referring to FIG. 10.

Firstly, the light deflector 10 is driven by means of a single sinusoidal wave of θ(t)=A10·sin(ωt). Then, the offset δΨ is determined from the times t0, t1, t2 and t3 detected by the photodetector 14 by means of the formula (5). This step is a step of driving the light deflector with a predetermined drive signal by means of the driving unit and determining the offset of scanning light according to the clock times of the passing of scanning light as detected by the photodetector.

Then, the light deflector 10 is driven by a synthetic wave formed by synthetically combining waves of two frequencies. If the light deflector 10 has an offset of δΨ, the deflection angle θ of scanning light is expressed by the formula (6). Then, the center of the light beam irradiating the target to be scanned 20 is displaced from the center of the target to be scanned 20 by δΨ. Then, the values of the parameters A1, A2 and ø in the formula (6) are adjusted and controlled so as to make them show desired respective values in order to obtain a waveform that is approximated to the waveform expressed by θ(t)=A1·sin(ωt)+A2·sin(2ωt+ø) in a partial domain of time t. The adjustments are conducted according to the determined offset δΨ. This step is a step of adjusting and controlling the deflection angle including a predetermined deflection angle and the offset in order to obtain the deflection angle of scanning light as approximated to the predetermined deflection angle in a partial domain of time according to the determined offset.

Additionally, the target time for a situation where $\theta(t)= A1 \cdot \sin(\omega t)+A2 \cdot \sin(2\omega t+\o)$ holds true and hence there is no offset $\delta\Psi$ is converted to the target time for a situation where there is an offset of $\delta\Psi$. This step is a step of converting the target time for the predetermined deflection angle to the target time for the deflection angle including the offset and adjusted and controlled according to the determined offset. Matrix M is already determined by using a drive signal that corresponds to $\theta(t)=A1 \cdot \sin(\omega t)+A2 \cdot \sin(2\omega t+\o)$. Therefore, the parameters of the drive signal are controlled according to the detection signal from the photodetector 14 and using the target time obtained as a result of the conversion and the matrix M, starting from the drive signal that corresponds to $\theta(t)= A10 \cdot \sin(\omega t)$. This step is a step of controlling the drive signal to be supplied to the driving unit, using the matrix M computationally determined by using the drive signal corresponding to the predetermined deflection angle according to the detection signal from the photodetector and the target time obtained as a result of the conversion, starting from the drive signal showing initial values. In this way, the oscillating motion of the deflection angle is converged to an oscillating motion where the parameters A1, A2 and ø of the above formula (6) are adjusted to show desired respective values.

As a result of the above-described control operation, the influence of the offset can be reduced in the domain where the target to be scanned 20 is desirably scanned substantially at a constant velocity.

(Image Forming Apparatus)

Figure 11:
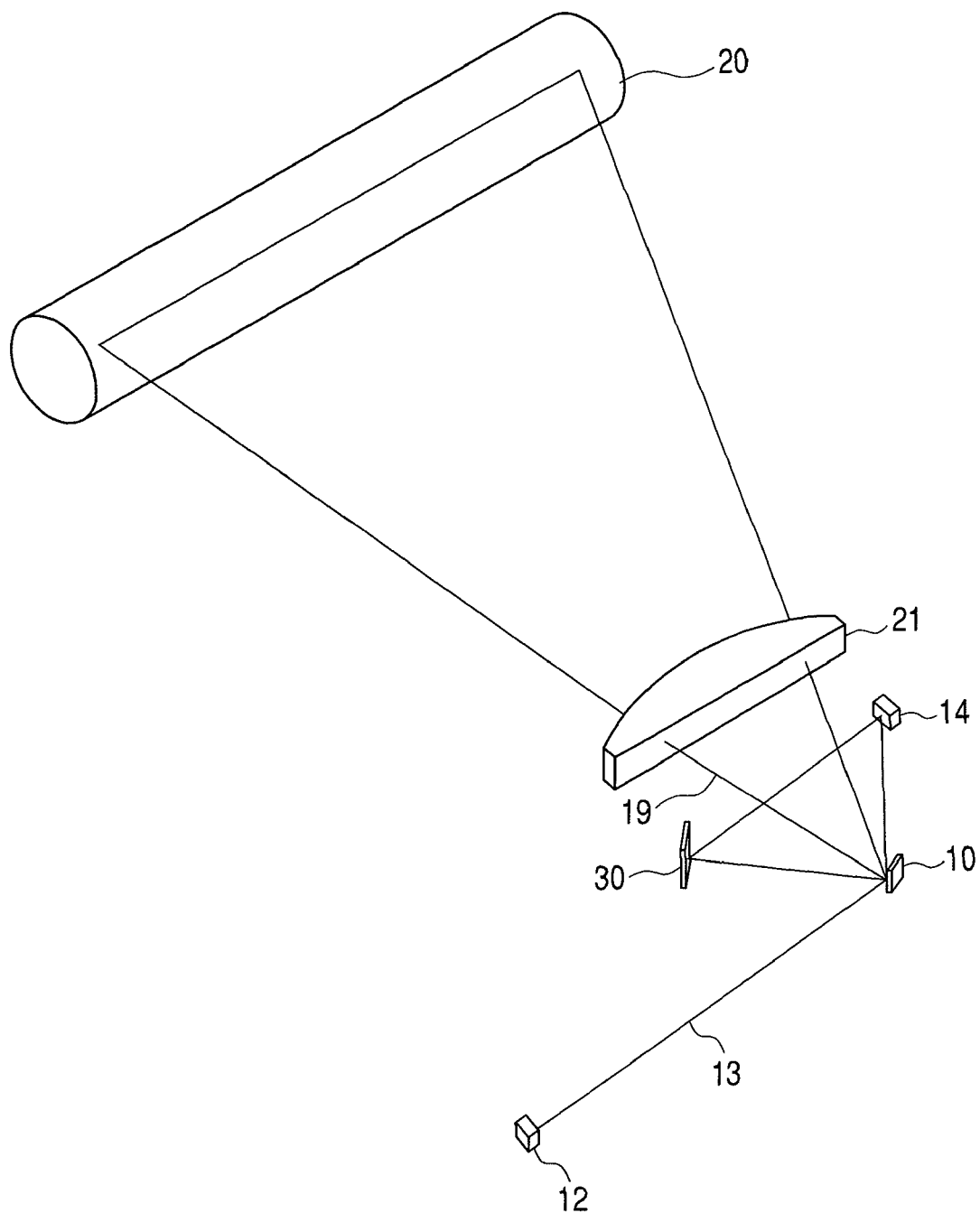
FIG. 11 is a schematic illustration of an image forming apparatus employing a light deflector device according to the present invention.

Now, an image forming apparatus formed by using a light deflector device of this embodiment will be described below by referring to FIG. 11. A light beam 13 is emitted from the light source 12. The light beam is rectified for its shape by means of an aperture and a collimator lens provided at the light source and subsequently made to strike the light deflector 10 so as to be deflected by the latter. Scanning light 19 is focused on a photosensitive drum 20 through a lens 21. The photodetector 14 is arranged on deflection angle θ1 of scanning light 19 produced by the light deflector 10 and the angular velocity of the deflection angle of the light deflector is controlled so as to drive scanning light 19 to scan at a substantially constant velocity on the photosensitive drum 20. From the structural viewpoint of the light deflector 14, a technique of arranging at least two light receiving elements or a technique of guiding the light beam 19 to a single light receiving element 14 by means of an optical system or a reflector 30 so that the deflection angle can be detected at least at two points can be employed. FIG. 11 illustrates the use of the latter technique.

The degree of accuracy required for arranging the light source 12, the light deflector 10 and the photodetector 14 is alleviated and the number of assembling steps is reduced by using a light deflector device of this embodiment. Then, as a result, the accuracy of the exposure position on the photosensitive drum 20 is improved to by turn improve the quality of the image formed there.

EXAMPLE

Now, the present invention will be described further by way of a specific example. An example of offset correction method will be mainly described below. Otherwise, the specifics of the example are the same as those of the above-described embodiment.

A method of correcting the offset by observing the clock times when scanning light 19 passes θ1 and θ2 by means of the arrangement of FIG. 1 with two light receiving elements 14 will be described. In this instance, the deflection angle θ of the light deflector 10 is expressed by the above-described formula (2) when the offset is equal to 0. While a drive signal as expressed by the above-described formula (3) is employed, the control parameters of the formula (2) are adopted as the control parameters of the formula (3) because the latter formula corresponds to the expression of the formula (2).

The following values that are obtained when control parameter X that includes one of A1, A2 and ø of the drive signal of the light deflector 10 is minutely changed are determined in advance. In other words, the coefficients that respectively represent the changes of the relative detection times t1−t0, t2−t0 and t3−t0 when scanning light 19 passes the first and second light receiving elements 14 and the matrix M are determined in advance. They are expressed by the following formulas:

$$\left.\frac{\partial t}{\partial X}\right|_{ti} - \left.\frac{\partial t}{\partial X}\right|_{t0}, (X = A1, A2, \phi), (i = 1, 2, 3) \quad (7)$$

and $$M = \begin{bmatrix} \left.\frac{\partial t}{\partial A1}\right|_{t1} - \left.\frac{\partial t}{\partial A1}\right|_{t0} & \left.\frac{\partial t}{\partial A2}\right|_{t1} - \left.\frac{\partial t}{\partial A2}\right|_{t0} & \left.\frac{\partial t}{\partial \phi}\right|_{t1} - \left.\frac{\partial t}{\partial \phi}\right|_{t0} \\ \left.\frac{\partial t}{\partial A1}\right|_{t2} - \left.\frac{\partial t}{\partial A1}\right|_{t0} & \left.\frac{\partial t}{\partial A2}\right|_{t2} - \left.\frac{\partial t}{\partial A2}\right|_{t0} & \left.\frac{\partial t}{\partial \phi}\right|_{t2} - \left.\frac{\partial t}{\partial \phi}\right|_{t0} \\ \left.\frac{\partial t}{\partial A1}\right|_{t3} - \left.\frac{\partial t}{\partial A1}\right|_{t0} & \left.\frac{\partial t}{\partial A2}\right|_{t3} - \left.\frac{\partial t}{\partial A2}\right|_{t0} & \left.\frac{\partial t}{\partial \phi}\right|_{t3} - \left.\frac{\partial t}{\partial \phi}\right|_{t0} \end{bmatrix} \quad (8)$$

Therefore, the operation values for amplitude and phase ΔA1, ΔA2 and Δø by which the light deflector 10 adjusts the drive signal are determined in a manner as described below. Namely, they are determined by the three time differences Δt1, Δt2 and Δt3 between the three detected relative time differences t1−t0, t2−t0 and t3−t0 and the three target times t10−t00, t20−t00 and t30−t00 by means of the formula shown below.

$$\begin{bmatrix} \Delta A1 \\ \Delta A2 \\ \Delta \phi \end{bmatrix} = M^{-1} \begin{bmatrix} \Delta t1 \\ \Delta t2 \\ \Delta t3 \end{bmatrix} \quad (9)$$

Thus, from the above relation, the quantities of adjustment ΔA1, ΔA2 and Δø of the drive signal are computationally determined on the basis of the time differences Δt1, Δt2 and Δt3 from the three target times t10−t00, t20−t00 and t30−t00. Then, the drive controlling unit 16 generates a drive signal 17 and outputs it to the driving unit 18 according to theses values. As the above control operation is repeated, the detected times are converged to the target clock times t00, t10, t20 and t30 so that a desired deflection angle θ can be obtained for the light deflector 10.

Now, an instance where the light deflector device has an offset will be described below. When the light deflector device has an offset angle Ψ and the light deflector 10 is driven only by using drive angular frequency ω1, the deflection angle θ can be expressed by formula (10) shown below.

$$\theta(t)=B \cdot \sin(\omega 1 \cdot t)+\Psi \quad (10)$$

Then, the control target time is converted as expressed by formula (11) shown below. More specifically, the conversion is realized by using the difference between the time interval of t1 to t0 when B ? A10 (Td1) with an offset angle and the same time interval (Td0) without any offset angle for and parameter $\alpha=(\alpha1, \alpha2, \alpha3)^T$ attributable to the offset angle. The instance of when B ? A10 refers to when the light deflector is driven with an angular frequency of ω1 and the amplitude B is raised to substantially the same level that is observed when the offset angle is 0.

$$\begin{bmatrix} t_{10} - t_{00} \\ t_{20} - t_{00} \\ t_{30} - t_{00} \end{bmatrix} \Rightarrow \begin{bmatrix} t_{10} - t_{00} \\ t_{20} - t_{00} \\ t_{30} - t_{00} \end{bmatrix} - \begin{bmatrix} \alpha_1 \\ \alpha_2 \\ \alpha_3 \end{bmatrix} *(Td1 - Td0) \quad (11)$$

The parameter α that is a function of Ψ can be substituted in a manner as expressed by formula (12) shown below, using a constant ε. This is because α1 and α2 show substantially the same value and α3 has a value that is sufficiently smaller than the value of each of α1 and α2.

$$\begin{bmatrix} \alpha_1 \\ \alpha_2 \\ \alpha_3 \end{bmatrix} = \begin{bmatrix} \varepsilon \\ \varepsilon \\ 0 \end{bmatrix} \quad (12)$$

When the light deflector device is drive in a manner as expressed by the formula (10), the offset angle can also be computationally determined from the clock times when scanning light passes particular deflection angles θ1 and θ2. Then, the parameter $\alpha=(\alpha1, \alpha2, \alpha3)^T$ can be directly determined by computations. The drive controlling unit 16 is also responsible for the above operations. Thus, as a result, a waveform that is approximated by the above formula (2) can be obtained at least in a partial interval of t.

Because there exists an offset in reality, the scanning waveform that is obtained when there is no offset cannot be obtained. However, a satisfactorily approximated light scanning operation can be realized in the angular range from the center of scanning of the light deflector 10 to the angle at which scanning light is detected by the photodetector 14.

As an example, take target values of A10=71.67 degrees, A20=11.67 degrees and ø0=0 and assume initial values of A1=72.00 degrees, A2=0.00 degree, ø=0.2π rad and offset angle Ψ=+1 degree. Also assume that the angles θ1 and θ2 detected by the photodetector are respectively θ1=–θ2=58.7 degrees. Then, t10–t00, t20–t00 and t30–t00 for Ψ=0 are respectively 0.195127/f, 0.575999/f and 0.771126/f when f=ω1/(2π).

Then, t10–t00, t20–t00 and t30–t00 are updated by using the formulas (11) and (12). Td1–Td0=0.007628/f is obtained by computations. As for ε, it varies depending on the control target and the angles detected by the photodetectors. The updated values of t10–t00, t20–t00 and t30–t00 are respectively 0.201288/f, 0.58216/f and 0.771068/f when ε=0.8. As a result of controlling the light deflector, using these values as target times, the deflection angles of scanning light were A1=71.682 degrees, A2=11.666 degrees and ø=0.0103 rad. The matrix M to be used for adjusting and controlling the drive signal at the time of the control operation for the target times can be computationally determined by means of a drive signal having parameters that correspond to the above-described parameters A10, A20 and ø0. Further, the drive signal at the control start time is a drive signal having parameters that correspond to the above-described parameters A10, A20 and ø0.

Figure 12A:
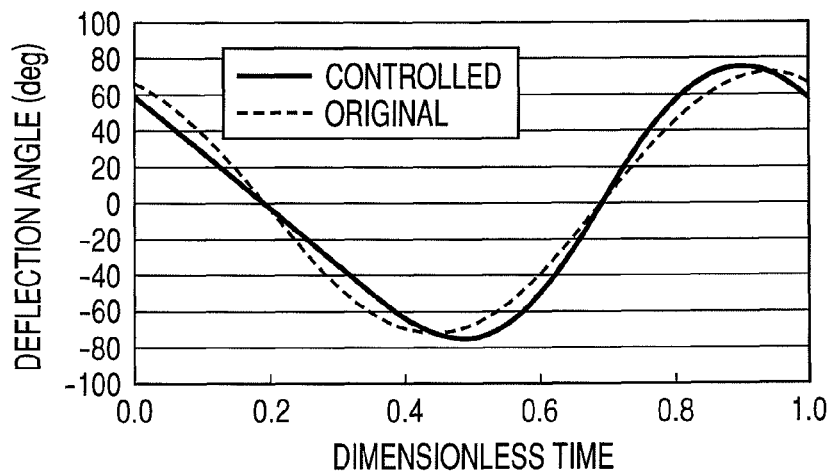
FIGS. 12A, 12B and 12C are schematic illustrations of examples of correction of the offset of the light deflector device.
Figure 12B:
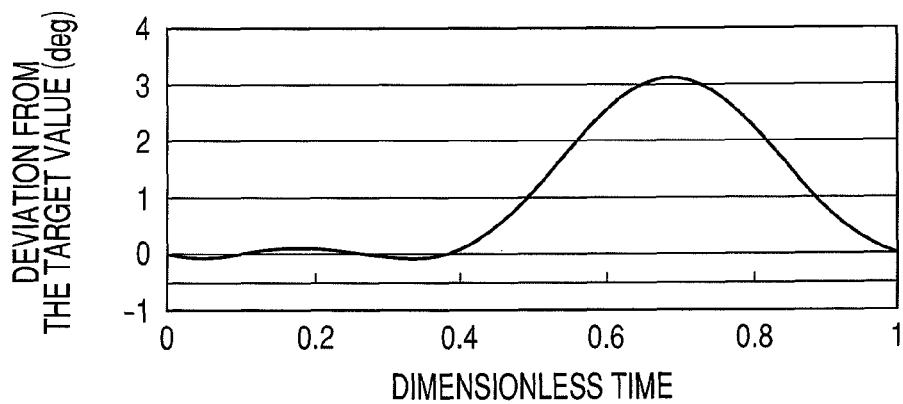
Figure 12C:
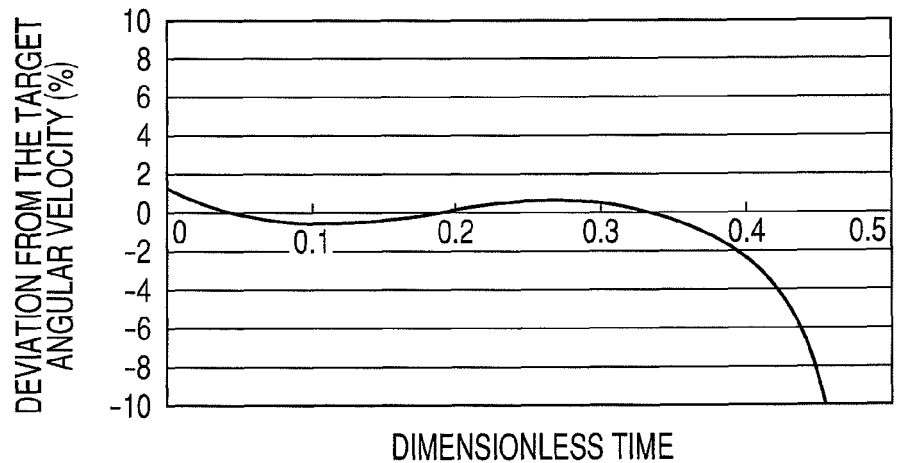

FIG. 12A illustrates the results of the control operation. In FIG. 12A, the horizontal axis indicates time that is turned dimensionless by frequency and the origin is made to agree with the clock time when θ1 starts scanning toward the center of scanning. FIG. 12B illustrates the deflection angle error. It can be converged to within ±0.1 degrees of the control target in the interval of 0 to 0.4 of dimensionless time. Then, the influence of the offset angle Ψ can be reduced to about ±10% within the above interval. Additionally, by seeing the angular velocity error (FIG. 12C), it will be found that the error is confined to within ±1% from 0.05 to about 0.35 in terms of dimensionless time (time multiplied by f) so that both the angle and the angular velocity can be controlled substantially to the target values in a partial interval of 1 cycle period.

From the above, the deviation of the deflection angle can be reduced to about ±10% of the offset angle and deviation of the angular velocity can be controlled to within ±1% of the target value when the offset angle is about 1.5% of the maximum oscillation angle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-126596, filed May 14, 2008, which is hereby incorporated by reference in its entirety.

The invention claimed is:

1. A light deflector device comprising:
a light source;
a light deflector for deflecting light from the light source; and
a photodetector for detecting information relating to a deflection angle of scanning light deflected by the light deflector,
the light deflector having:
a support portion;
an oscillation system including at least a first oscillating body, a first elastic support portion supporting the first oscillating body so as to make it able to oscillate relative to the support portion around an axis of oscillation, a second oscillating body and a second elastic support portion supporting the second oscillating body so as to make it able to oscillate relative to the first oscillating body around the same axis as the axis of oscillation of the first oscillating body;
a driving unit for applying a torque to at least either the first oscillating body or the second oscillating body; and
a drive controlling unit for supplying a drive signal to the driving unit, wherein
a light deflecting element is formed at least on one surface of at least either the first oscillating body or the second oscillating body,
the oscillation system is adapted to be able to simultaneously generate a first oscillating motion of moving at a first frequency, the first frequency being a fundamental frequency, and a second oscillating motion of moving at a second frequency, the second frequency being a frequency of integer times of the fundamental frequency, and
the drive controlling unit is adapted to supply a drive signal formed by synthetically combining a first signal having the first frequency and a second signal having the second frequency to the driving unit and, at the same time, supply another drive signal for changing at least the amplitude of the first oscillating motion, the amplitude of the second oscillating motion or the relative phase difference of the first oscillating motion and the second oscillating motion to the driving unit in order to correct an offset of scanning light deflected by the light deflector.

2. The device according to claim 1, wherein the drive controlling unit computationally determines the offset of scanning light according to a clock time when the scanning light passing it is detected by the photodetector as the light deflector is driven by means of a sinusoidal wave.

3. The device according to claim 1, wherein a displacement angle θ(t) of scanning light when the offset exists is expressed by $$\theta(t) = A1 \cdot \sin(\omega t) + A2 \cdot \sin(2\omega t + \emptyset) + \Psi,$$

where A1 and A2 are respectively the amplitude of the first oscillating motion and that of the second oscillating motion, ø is the phase difference between the first and second oscillating motions, t is time, ω is the angular frequency of the first oscillating motion and Ψ is the offset of scanning light, and the drive controlling unit corrects the offset of scanning light deflected by the light deflector by controlling the drive signal so as to modify the values of A1, A2 and ø.

4. An image forming apparatus comprising:
a light source; and
a light deflector device for deflecting light emitted from the light source according to claim 1, and
being adapted to irradiate a target to be scanned with at least part of light deflected by the light deflector device.

5. An offset correction method for correcting an offset of scanning light in a light deflector device having a light source, a light deflector for deflecting light from the light source and a photodetector for detecting information relating to a deflection angle of scanning light deflected by the light deflector, the light deflector including a support portion, an oscillation system including at least a first oscillating body, a first elastic support portion supporting the first oscillating body so as to make it able to oscillate relative to the support portion around an axis of oscillation, a second oscillating body and a second elastic support portion supporting the second oscillating body so as to make it able to oscillate relative to the first oscillating body around the same axis as the axis oscillation of the first oscillating body, and a driving unit for applying a torque to at least either the first oscillating body or the second oscillating body, the method comprising:
driving the light deflector by means of the driving unit according to a predetermined drive signal and determining the offset of scanning light according to a passing time of scanning light as detected by the photodetector;
adjusting and controlling the deflection angle of scanning light including a predetermined deflection angle and the offset in order to obtain a deflection angle as approximated to the predetermined deflection angle in a partial domain of time according to the determined offset;
converting a target time for the predetermined deflection angle to a target time for the deflection angle of scanning light including the offset and adjusted and controlled according to the determined offset; and
controlling the predetermined drive signal to be supplied to the driving unit, using a matrix M computationally determined by using the drive signal controlled corresponding to the predetermined deflection angle according to a detection signal from the photodetector and the target time obtained as a result of the conversion, starting from the drive signal showing initial values.

* * * * *